(12) United States Patent
Douaire et al.

(10) Patent No.: US 6,419,965 B1
(45) Date of Patent: *Jul. 16, 2002

(54) METHOD FOR PREPARING LEAVENED DOUGH OR LEAVENED PUFF PASTRY FOOD PRODUCTS

(76) Inventors: Philippe Douaire, 12, Rue des Deux Ponts, 75004 Paris (FR); Madame Sandrine Vincensini, 24, Rue de Bercy, 75012 Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,133
(22) PCT Filed: May 2, 1996
(86) PCT No.: PCT/FR96/00665
  § 371 (c)(1),
  (2), (4) Date: Feb. 5, 1998
(87) PCT Pub. No.: WO96/34530
  PCT Pub. Date: Nov. 7, 1996

(30) Foreign Application Priority Data

May 2, 1995 (FR) .............................. 95 05203
Jul. 17, 1995 (FR) .............................. 95 08594

(51) Int. Cl.[7] .................. A21D 2/08; A21D 6/00; A21D 8/02
(52) U.S. Cl. .................. 426/19; 426/94; 426/496; 426/502; 426/504; 426/549
(58) Field of Search .................. 426/19, 20, 549, 426/94, 502, 504, 496

(56) References Cited

U.S. PATENT DOCUMENTS

| 4,395,426 | A | | 7/1983 | Fan | 426/62 |
|---|---|---|---|---|---|
| 4,666,719 | A | * | 5/1987 | Spiller | 426/18 |
| 4,986,992 | A | * | 1/1991 | Glaros et al. | 426/19 |
| 5,030,466 | A | * | 7/1991 | Kageyama et al. | 426/502 |
| 5,182,123 | A | * | 1/1993 | Edo et al. | 426/19 |
| 5,348,751 | A | * | 9/1994 | Packer et al. | 426/94 |
| 5,580,599 | A | * | 12/1996 | Fehr | 426/499 |
| 5,702,732 | A | * | 12/1997 | Piller | 425/145 |
| 5,766,663 | A | * | 6/1998 | Neumann et al. | 426/499 |

FOREIGN PATENT DOCUMENTS

| EP | 207903 | | 1/1987 |
|---|---|---|---|
| EP | 443807 | | 8/1991 |
| EP | 443 807 | * | 8/1991 |
| SU | 1076055 A | * | 3/1984 |
| WO | WO 93/22928 | * | 11/1993 |

OTHER PUBLICATIONS

Faridi, H., The Science of Cookie and Cracker Production, pp. 6–8, 1994.*
Rombauer et al., The Joy of Cooking., Bons–Merrill Co., pp. 605–606, 1975.*
Bocuse et al., The New Profesional Chef—The Culinary Institute of America., 6th Ed., Van Nostrand., pp. 382–385, 1996.*
Rombauer, I., Joy of Cooking, Boss–Merrill Publishing Co., pp. 643–645, 1975.*

* cited by examiner

*Primary Examiner*—Arthur L. Corbin
(74) *Attorney, Agent, or Firm*—Alston & Bird LLP

(57) ABSTRACT

Leavened dough-based food products and leavened puff pastry-based food products are produced without the need for providing by a process which comprises preparing dough by mixing gluten, flour, yeast and water; kneading the dough, cutting the dough into parts and forming the parts into the shape of the product to be manufactured, compressing the shaped dough parts so as to extend the gluten and to allow the compressed dough parts to expand during a subsequent baking step, and baking the compressed dough parts.

13 Claims, 1 Drawing Sheet

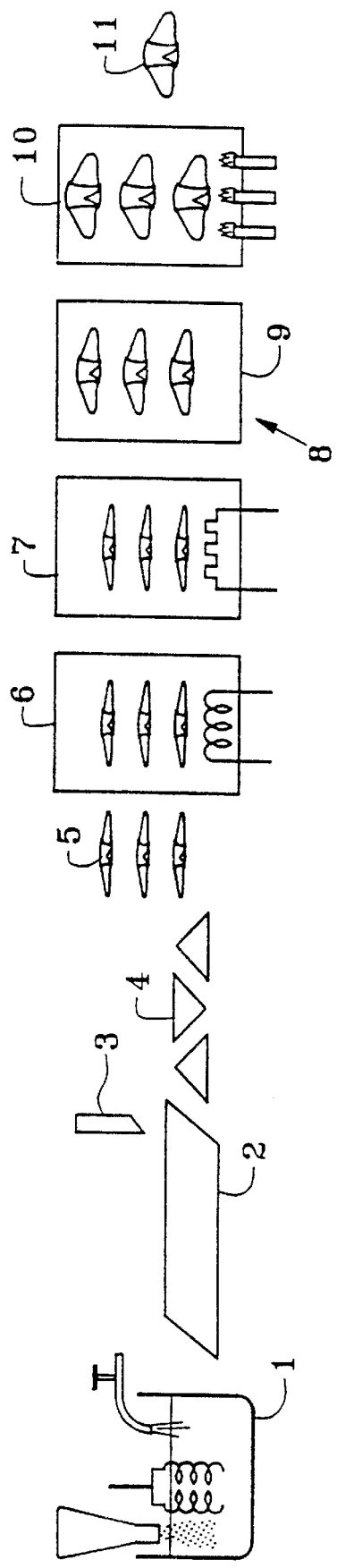
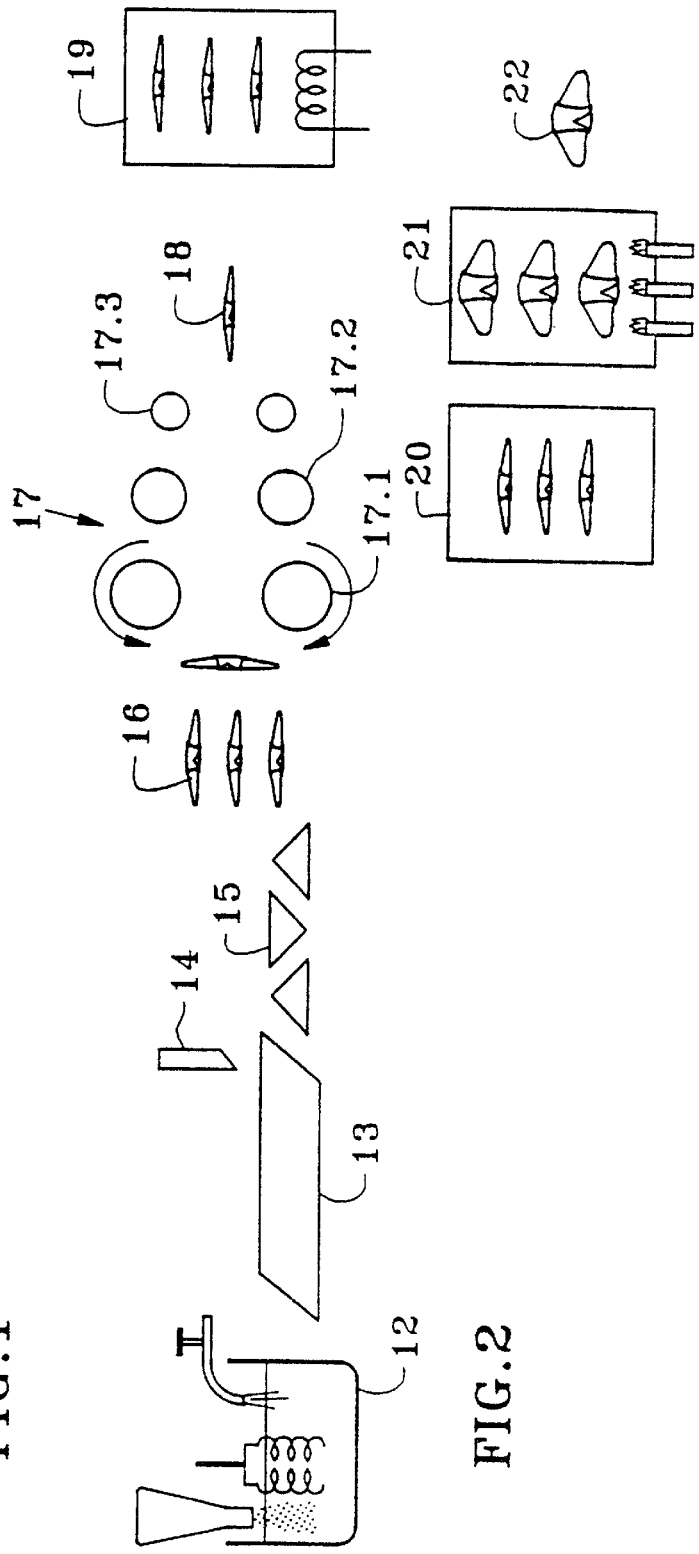
FIG.1
FIG.2

METHOD FOR PREPARING LEAVENED DOUGH OR LEAVENED PUFF PASTRY FOOD PRODUCTS

BACKGROUND OF THE INVENTION

The present invention relates mainly to a leavened dough and to the food products based on such a dough, particularly bread, to a leavened puff pastry and to the food products based on such a dough, particularly Viennese bakery products, and to the process for their manufacture.

Leavened dough or leavened puff pastry proves by virtue of the release of carbon dioxide gas by yeast and of water vapour during fermentation and proving operations. The proving of leavened doughs or of leavened shortcrust pastries ties up for a long time an expensive proving room and consumes large amounts of energy. Furthermore, the brittleness of the fresh or frozen, proved dough limits the possibilities for its treatment, handling and/or transportation.

It is consequently an aim of the present invention to provide a leavened dough or a leavened puff pastry requiring no proving step.

It is also an aim of the present invention to provide a leavened dough or a leavened puff pastry which, after a proving step, has a large volume.

It is also an aim of the present invention to provide food products based on such a dough exhibiting excellent organoleptic qualities.

It is also an aim of the present invention to provide food products having a nice appearance, particularly an even aerated dough.

It is also an aim of the present invention to provide food products based on leavened dough or leavened puff pastry allowing long preservation and rapid preparation.

It is also an aim of the present invention to provide an industrial process for the manufacture of food products based on leavened dough or leavened puff pastry.

It is also an aim of the present invention to provide food products based on leavened dough and/or leavened puff pastry having a low production cost.

It is also an aim of the present invention to make it possible to obtain raw, raw pre-proved, raw proved or baked products which have a good deep freezing behaviour.

These aims are achieved according to the present invention by rolling out the dough at the end of forming, which, surprisingly, makes it possible to obtain an aerated dough by baking without a proving step, or to increase the volume of a proved dough.

SUMMARY OF THE INVENTION

The subject of the invention is mainly a process for the manufacture of a food product comprising the steps consisting in:

a) preparing a leavened dough or a leavened puff pastry containing gluten, based on flour and water;

b) kneading the dough;

c) shaping or forming the dough;

characterized in that is comprises, in addition, a subsequent step consisting in:

d) rolling out the dough so as to extend the glutens in order to allow the development of the dough during a subsequent baking step.

The subject of the invention is also a process, characterized in that step d) is a step for laminating the dough.

The subject of the invention is also a process, characterized in that in step d), the dough is progressively laminated by passing between a plurality of pairs of rolls, the space left between the two rolls of a pair being less than the space left between the two rolls of the preceding pair.

The subject of the invention is also a process, characterized in that an edible hydrocolloid or a mixture of edible hydrocolloids is incorporated into the dough.

The subject of the invention is also a process, characterized in that cystein is incorporated into the dough in proportions corresponding to a reducing action on the glutens.

The subject of the invention is also a process, characterized in that the hydrocolloid(s) comprise(s) gelatin.

The subject of the invention is also a process, characterized in that the hydrocolloid(s) comprise(s) CMC.

The subject of the invention is also a process, characterized in that the hydrocolloid(s) comprise(s) pectin.

The subject of the invention is also a process, characterized in that it comprises, in addition, a subsequent step e) of freezing the rolled out, particularly laminated, dough.

The subject of the invention is also a process, characterized in that it comprises between the step d) of rolling out the dough and the step e) of freezing the dough, a step f) consisting in resting the dough at room temperature for 10 to 20 min.

The subject of the invention is also a process, characterized in that it comprises, in addition, a subsequent step g) of baking the dough.

The subject of the invention is also a Viennese bakery product comprising a leavened puff pastry, particularly croissants, characterized in that it is manufactured by the process according to the invention.

BRIEF DESCRIPTION OF THE DRAWINGS

The invention will be understood more clearly by means of the description below and of the accompanying figures given as nonlimiting examples and in which:

FIG. 1 is a synoptic diagram of a process for the manufacture of croissants of the known type;

FIG. 2 is a similar view of the preferred example of the process according to the present invention.

In FIG. 1, there may be seen a process of the known type for the industrial preparation of croissants.

In 1, the ingredients, particularly flour and water, are mixed and the dough is kneaded.

In 2, the croissants are subjected to folding and rolling by forming a laminar structure comprising superimposed layers of dough and layers of fat, typically margarine or butter.

In 3, the dough is cut into a triangle 4.

In 5, the croissants are rolled up in order to give them their traditional shape.

Usually, the croissants can be preserved during manufacture, for durations of between several hours and several months, by freezing 6.

In 7, the croissants are thawed before a proving step 8 in a proving room 9 comprising means for regulating the temperature and the hydrometry. Typically, the proving of croissants lasts for 1 to 2 hours at a temperature of 28 to 30°

C. and a humidity of 80%. During proving, the yeasts present in the croissant dough break down the sugars, releasing carbon dioxide gas, causing a rise in the croissants which triple in volume.

In 10, the croissants are baked in an oven. After baking, the croissants 11 are ready to be consumed.

The traditional manufacture of croissants 11 requires the availability of a proving room 9 which constitutes a large investment, occupies a large volume and consumes a lot of energy. The continuous manufacturing output of croissants is limited by the capacity of the proving room, in which space must furthermore be provided between the adjacent croissants given their increase in volume during proving. Indeed, contact between croissants causes sticking of the dough, damaging their appearance.

To reduce the time between the thawing 7 and the availability of the croissants ready to be consumed, so-called "pre-proved" croissants have been proposed which were frozen on leaving the proving room after leavening of the dough. The frozen pre-proved croissants have a high production cost and occupy a large volume. Furthermore, the pre-proved croissants are extremely fragile, it being possible for their organoleptic properties and their appearance to be damaged by mechanical constraints or any break in the cold chain.

DESCRIPTION OF PREFERRED EMBODIMENTS

The preferred example of the process according to the present invention can be seen in FIG. 2. Firstly, the dough is prepared for example from the same ingredients as that for conventional croissants. However, the process according to the present invention is improved by adding gluten and an edible hydrocolloid or a mixture of edible hydrocolloids, particularly gelatin, advantageously soluble in water, and cystein hydrochloride, commonly called cystein. Advantageously, the measured quantity of cystein is such that it has a reducing action on the gluten so as to promote its extension. The glutens form impervious cell walls which, by retaining water vapour, participate predominantly in the development of the croissants during baking. The flexibility of the glutens is improved by cystein which makes them less tough, whereas the improver promotes the imperviousness of the walls of the gluten cells by reducing their porosity. The formula may also comprise guar gum flour. Gelatin and guar gum increase the retention of water whose evaporation in the gluten cells during baking promotes dough development. Furthermore, gelatin improves the imperviousness of individual cells formed by the glutens and makes it possible to increase by 10% the volume of the croissants ready to be consumed. The preferred example of products used is given in Table 1, the ingredients of two examples of improver used being described in Tables 2 and 3.

It should be noted that the yeast is added mainly to obtain a croissant having the same taste as conventional croissants. However, the manufacture of croissants or any other product based on leavened dough or leavened puff pastry free of yeasts, is not outside the scope of the present invention.

TABLE 1

| RECIPE | % by weight/ flour | Example of % | Quantity |
|---|---|---|---|
| Ingredients: | | | |
| US-type confectionery flour | | | 100 kg |
| (W: 300; P/L: 0.6; proteins: 13%) | | | |
| (G: 24, according to the CHOPIN standard | | | |
| Falling number test: 320, according to | | | |
| the Hadberg standard) | | | |
| Standard yeast | 4 to 9% | 8.0% | 8 kg |
| Sugar | 6 to 12% | 8.0% | 8 kg |
| Salt | 1.5 to 2.2% | 1.8% | 1.8 kg |
| Cystein | 20 to 80 ppm | 40 ppm | 4 g |
| Improver | 2 to 4% | 3.0% | 3 kg |
| Gluten | 2 to 7% | 5% | 5 kg |
| Instant gelatin | 1 to 7% | 4% | 4 kg |
| Water | 68 to 76% | 74% | 74 l |
| Dough total | | | 203.80 kg |
| Butter (25% of the dough) | | | 50.95 kg |
| TOTAL | | | 254.75 kg |

TABLE 2

| IMPROVER (at 3.0% of the weight of flour) | % by weight | /Flour quantity | % flour |
|---|---|---|---|
| Ingredients: | | | |
| Soybean lecithin (E 322) | 5.4% | 162.00 g | 0.16% |
| Autolysed inactivated yeast) | 5.0% | 150.00 g | 0.15% |
| Dextrose | 25.0% | 750.00 g | 0.75% |
| Fungal alpha-amylases with secondary activity | 0.40% | 12.00 g | 0.012% |
| Alpha-amylases (10,000 SKB) | 0.05% | 1.50 g | 0.002% |
| Ascorbic acid (E 300) | 0.30% | 9.00 g | 0.009% |
| Wheat-gluten | 37.5% | 1125.00 g | 1.13% |
| Guar gum flour (E 412) | 7.0% | 210.00 g | 0.21% |
| Data-esters (E 472e) | 5.0% | 150.00 g | 0.15% |
| Nonenzymatic soybean flour | 12.7% | 381.00 g | 0.38% |
| Flour T55 | 1.6% | 49.20 g | 0.05% |
| TOTAL | 100.0% | 3000.00 g | 3.00% |

TABLE 3

(10.0% of the weight of flour)

| Ingredients | % | /Qt. flour | %/flour | % range/flour from | to |
|---|---|---|---|---|---|
| Soybean lecithin (E 322) | 1.410% | 141.00 g | 0.14% | 0.13% | 0.16% |
| Autolysed inactivated | 1.500% | 150.00 g | 0.15% | 0.14% | 0.17% |

TABLE 3-continued (10.0% of the weight of flour)

| Ingredients | % | /Qt. flour | %/flour | % range/flour from | to |
|---|---|---|---|---|---|
| yeast | | | | | |
| Dextrose | 7.500% | 750.00 g | 0.75% | 0.68% | 0.83% |
| Fungal alpha-amylases with secondary activity | 0.120% | 12.00 g | 0.012% | 0.011% | 0.013% |
| Alpha-amylases (10,000 SKB) | 0.015% | 1.50 g | 0.002% | 0.001% | 0.002% |
| Ascorbic acid (E 300) | 0.090% | 9.00 g | 0.009% | 0.008% | 0.010% |
| Wheat gluten | 58.910% | 5891 g | 5.89% | 1.00% | 8.00% |
| Guar gum flour (E 412) | 2.100% | 210.00 g | 0.21% | 0.19% | 0.23% |
| Data-esters (E 472e) | 1.500% | 160.00 g | 0.15% | 0.14% | 0.17% |
| Nonenzymatic soybean flour | 3.825% | 382.50 g | 0.38% | 0.34% | 0.42% |
| Cystein | 0.030% | 3.00 g | 0.0030% | 0.0027% | 0.0033% |
| Gelatin | 23.000% | 2300 g | 2.30% | 1.00% | 5.00% |
| TOTAL | 100.0% | 10,000 g | 10.00% | | |

TABLE 4

(8.0% of the weight of flour)

| Ingredients | % | /Qt. flour | %/flour | % range/flour from | to |
|---|---|---|---|---|---|
| Soybean lecithin (E 322) | 1.763% | 141.00 g | 0.14% | 0.13% | 0.16% |
| Autolysed inactivated yeast | 1.875% | 150.00 g | 0.15% | 0.14% | 0.17% |
| Dextrose | 9.375% | 750.00 g | 0.75% | 0.58% | 0.83% |
| Fungal alpha-amylases with secondary activity | 0.150% | 12.00 g | 0.012% | 0.011% | 0.013% |
| Alpha-amylases (10,000 SKB) | 0.019% | 1.50 g | 0.002% | 0.001% | 0.002% |
| Ascorbic acid (E 300) | 0.113% | 9.00 g | 0.009% | 0.008% | 0.010% |
| Wheat gluten | 73.64% | 5891 g | 5.89% | 1.00% | 8.00% |
| Guar gum flour (E 412) | 2.63% | 210.00 g | 0.21% | 0.19% | 0.23% |
| Data-esters (E 472e) | 1.88% | 150.00 g | 0.15% | 0.14% | 0.17% |
| Nonenyzmatic soybean flour | 4.78% | 382.50 g | 0.38% | 0.34% | 0.42% |
| Cystein | 0.0375% | 3.00 g | 0.0030% | 0.0027% | 0.0033% |
| CMC (E 466) | 3.75% | 300.00 g | 0.30% | 0.20% | 1.00% |
| TOTAL | 100.0% | 8000 g | 8.00% | | |

CMC: HERCULES trade mark, type: BLANOSE 7HXF

The gelatin can be replaced or supplemented, in the improver, with other edible hydrocolloids such as for example pectin or carboxymethyl cellulose, commonly called CMC (European code: E466).

The importance of using this additive lies essentially in the following properties and characteristics: dissolves rapidly in cold water, acts as a rheological regulator, a binder, a stabilizer, a protective colloid and a water retaining agent thus allowing better development upon baking and better preservation of the products, forms films which are resistant to oils, to fat and to gasses, giving more developed and more even products, makes it possible to improve the resistance of the doughs to shearing during the kneading phases, is physiologically inert, has no effect on the organoleptic qualities of the finished products, makes it possible to increase the hydration of the doughs by 5 to 15%.

The preferred example of the process according to the present invention with the percentage ranges which make it possible to adapt to the various flours used, the CMC as well as the other additives or ingredients used can be seen in Table 4.

The CMC used in Table 4 is manufactured by the company HERCULES, type BLANOSE 7HXF or AQUASORB (registered trade marks).

CMC and gelatin make it possible to obtain comparable results as regards the finished products.

It is also possible to use a pectin-based improver, for example of the FREEZE-BIG type (registered trade mark) marketed by the company HERCULES.

It is understood that the abovementioned hydrocolloids can be mixed with each other or with other edible hydrocolloids. Likewise, the use of other hydrocolloids or of mixtures thereof makes it possible to improve the development of the dough and is not outside the scope of the present invention.

It is clearly understood that the manufacture of products other than croissants from the mixture in Tables 1 to 4 is not outside the scope of the present invention.

In the example of manufacture of croissants of FIG. 2, in 12, there are introduced at an ambient temperature of 15° C. into a spiral kneader 74 liters of water to which 100 kg of flour are added. The water plus flour mixture should preferably not exceed 14° C., 8 kg of sugar, 1.8 kg of salt, 3 kg of improver (Table 2), 5 kg of gluten, 4 kg of soluble gelatin, for example of the SG type sold by the company PB GELATINE, 4 g of cystein corresponding to 40 ppm, are then added. It is possible to add to the preparation up to 10 kg of recent offcuts whose temperature does not exceed 15° C. The kneading is performed at the first speed for 5 min at a temperature of between 10 and 20° C., preferably between 12 and 14° C., for example at 13° C., then 8 kg of yeast are added, kneading at the second speed for 3 min. The temperature at the end of kneading is for example equal to 20° C., plus or minus 2° C.

The ranges for the components in Table 1 depend on the quality of the flour and the physical and organoleptic characteristics of the product which it is desired to obtain.

In 13, the folding and rolling are performed by an automatic chain with an extruder. The desired percentage of fat, typically butter, is first adjusted on the extruder. The extruded doughs are cooled in a freezing room for 45 min, so as to bring their temperature to about 12° C. The extruded laminar structure is folded on itself, for example according to the so-called three simple turns traditional technique.

In 14, individual portions of dough are cut.

In 16, the dough is formed into a croissant shape.

In 17, the croissants are rolled out so as to extend the glutens without breaking them.

The rolling out of the dough is not a simple operation of forming the product, but by bringing about the extension of the glutens so as to allow the development of the dough during baking independently of the action of the yeast, constitutes an essential characteristic of the invention. The rolling out makes it possible, for example, to reduce the thickness of the dough by a factor greater than or equal to 3, for example between 2 and 4, preferably equal to 3. For example, the thickness of a piece of dough 16 in the form of a croissant, whose initial thickness is for example equal to 25 mm, is reduced during the rolling out step 17 by 3 to 12 mm, preferably to 8 mm.

The rolling out can be obtained, for example, by placing under a press. Advantageously, the dough is rolled out by laminating. Advantageously, a progressive rolling machine comprising a plurality of pairs of rolls increasingly close together 17.1, 17.2, 17.3, is used. The even development of the croissants is promoted by a symmetrical laminating. For example, guiding means (not represented) orientate the longitudinal axis of the croissants 16 parallel to the axes of the laminating rolls 17.1, 17.2 and 17.3. Good results were also obtained with a single pair of rolls of large diameter, for example equal to 50 cm.

In the preferred embodiment, a floating laminating roll guided in vertical translation by columns arranged at the two ends of the roll, each column being provided with a vertical recess, is used.

The roll applies its weight on the croissant whose excess thicknesses slightly raise the said roll vertically guided by recesses.

The laminating rolls can be used in pairs, the two rolls of each pair being placed on either side of the croissant, or can roll out the croissant on a conveyor belt. The laminating is advantageously carried out at a temperature of between 8 and 10° C., for example at 10° C.

It should be noted that before baking, the laminated croissants 18 are not very bulky and are not sticky, which facilitates their handling. For some products, such as for example bread or brioches, a rest of between 10 and 45 min at a temperature of 25 to 32° C. with a humidity of 60 to 80% may be envisaged. The croissants are baked directly (in step 21) or frozen before baking if it is desired to increase the shelf life.

In 19, the croissants ready to be baked are deep-frozen.

In 20, the croissants are partially thawed by a 10 to 15 min rest at room temperature.

Although the process according to the invention makes it possible to manufacture Viennese bakery products or bread without a proving step, it is clearly understood that these products can be proved before baking without departing from the scope of the present invention.

Before baking, the croissants are advantageously glazed.

In 21, the baking is performed in an oven, preferably preheated to 220° C. The croissants 22 according to the present invention have organoleptic characteristics equivalent to those of known-type fresh croissants.

The freezing allows products ready for baking to be supplied to baking centres, particularly retail outlets, as well as selling of the raw product to the final consumer, the general public. The excellent preservation and the reduced volume of the product allows it to be transported over large distances, particularly during export.

It is clearly understood that the present invention is not limited to croissants but also applies to other Viennese bakery products, particularly croissants with a chocolate filling, raisin buns, brioches and the like, as well as to other products based on leavened dough or leavened puff pastry. Likewise, the manufacture of food products based on leavened dough, particularly bread, is not outside the scope of the present invention. In the latter case, a conventional bread dough or a dough advantageously comprising a supply of a hydrocolloid, particularly gelatin, is kneaded. The dough is kneaded, formed, cut, rolled out, advantageously laminated and baked. A freezing subsequent to the rolling out, particularly to the laminating makes it possible to preserve ready-to-bake bread for long periods.

As a variant, ingredients, for example based on vegetables, meat or cheese, are incorporated into the food product according to the invention, particularly into bread. The filling may be cooked prior to its incorporation into the bread dough and/or may be cooked simultaneously with the dough.

Such a food product may be advantageously deep-frozen and marketed in individual or family portions ready for baking.

Laminating without addition of hydrocolloid-based improver makes it possible to increase the volume of the dough by 30% additionally with more beautiful cells, the addition of such an improver makes it possible to double the increase in volume.

The invention is applied to the food industry.

What is claimed is:

1. A process for the manufacture of leavened dough-based food products without a proving step, said process comprising the steps of:
    a) preparing an unproofed leavened dough by mixing gluten, flour, yeast and water;
    b) kneading said dough;
    c) cutting said kneaded dough into parts and forming said parts into the shape of the dough-based food products to be manufactured;
    d) flattening or compressing the shaped dough-based food products obtained in step c) to reduce the thickness of the shaped dough-based food products by a factor of between 2 and 4 and to thereby produce shaped dough-based food products which will expand during a subsequent baking step; and
    e) baking the flattened or compressed shaped dough-based products obtained in step d) to manufacture the leavened dough-based food products.

2. The process according to claim 1, wherein in step d), the flattening or compressing of the shaped dough-based food products is carried out by passing them between a plurality of pairs of rolls, the space left between the two rolls of a pair being less than the space left between the two rolls of the preceding pair.

3. The process according to claim 1, wherein step a) further comprises incorporating an edible hydrocolloid or a mixture of edible hydrocolloids into the dough.

4. The process according to claim 3 wherein the hydrocolloid or mixture of hydrocolloids is one or more members selected from the group consisting of gelatin, carboxymethyl cellulose and pectin.

5. The process according to claim 1, wherein step a) further comprises incorporating cysteine into the dough in proportions corresponding to a reducing action on the gluten.

6. The process according to claim 1 including a further step of freezing the compressed or flattened dough-based food products prior to said baking step.

7. The process according to claim 6, wherein between the step d) of flattening or compressing the shaped dough-based food products and the step of freezing the compressed dough-based food products, a step is performed comprising resting the flattened or compressed dough-based food products at room temperature for 10 to 20 min.

8. The process according to claim 1, wherein the dough-based food products comprise viennese bakery products.

9. A process for the manufacture of leavened puff pastry based food products without a proving step comprising the steps of:
    a) preparing an unproofed, leavened dough by mixing gluten, flour, yeast and water;
    b) kneading said dough;
    c) folding and rolling out said kneaded dough with fat so as to form a laminar structure comprising superimposed layers of unproofed dough and layers of fat;
    d) cutting said laminar structure into parts and forming said parts into the shape of the puff pastry based food products to be manufactured;
    e) flattening or compressing the shaped food products obtained in step d) to reduce the thickness of the shaped food products by a factor of between 2 and 4; and
    f) baking the flattened or compressed food products obtained in step e) to manufacture the leavened puff pastry-based food products.

10. The process of claim 9, wherein in step e) the flattening or compressing of the shaped food products is carried out by passing them between a plurality of pairs of rolls, the space left between the two rolls of a pair being less than the space left between the two rolls of the preceding pair.

11. The process according to claim 9, wherein step a) further comprises incorporating an edible hydrocolloid or a mixture of edible hydrocolloids into the dough, the hydrocolloid or mixture of hydrocolloids being one or more members selected from the group consisting of gelatin, carboxymethyl cellulose and pectin.

12. A process for the manufacture of leavened dough-based food products without a proving step, said process comprising the steps of:
    a) preparing an unproofed, leavened dough by mixing flour, yeast, water, gluten in addition to that contained in the flour, cysteine and an edible hydrocolloid or a mixture of edible hydrocolloids;
    b) kneading said dough;
    c) cutting said kneaded dough into parts and forming said parts into the shape of the dough-based food products to be manufactured;
    d) flattening or compressing the shaped dough-based food products obtained in step c) to reduce the thickness of the shaped dough-based food products by a factor of between 2 and 4 and to thereby produce shaped dough-based food products which will expand during a subsequent baking step, and;
    e) baking the flattened or compressed shaped dough-based products obtained in step d) to manufacture the leavened dough-based food products.

13. A process for the manufacture of leavened puff pastry based food products without a proving step comprising the steps of:

a) preparing an unproofed, leavened dough by mixing flour, yeast, water, gluten in addition to that contained in the flour, cysteine and an edible hydrocolloid or a mixture of edible hydrocolloids;

b) kneading said dough;

c) folding and rolling out said kneaded dough with fat so as to form a laminar structure comprising superimposed layers of unproofed dough and layers of fat; p1 d) cutting said laminar structure into parts and forming said parts into the shape of the puff pastry based food products to be manufactured;

e) flattening or compressing the shaped food products obtained in step d) to reduce the thickness of the shaped food products by a factor of between 2 and 4; and f) baking the flattened or compressed food products obtained in step e) to manufacture the leavened puff pastry-based food products.

\* \* \* \* \*

UNITED STATES PATENT AND TRADEMARK OFFICE
CERTIFICATE OF CORRECTION

PATENT NO. : 6,419,965 B1  
DATED : July 16, 2002  
INVENTOR(S) : Douaire et al.

It is certified that error appears in the above-identified patent and that said Letters Patent is hereby corrected as shown below:

<u>Title page,</u>  
Item [56], References Cited, OTHER PUBLICATIONS, cancel "The";  
"Bons-Merrill" should read -- Bobbs-Merrill --; after "Nostrand" insert -- Reinhold --;  
"Boss-Merrill Publishing Co." should read -- Bobbs-Merrill Co. --.

Item [57], ABSTRACT,  
Line 3, "providing" should read -- proving --.

<u>Column 9,</u>  
Line 28, after "unproofed" insert a comma (,).

<u>Column 11,</u>  
Line 8, cancel "p1".

Signed and Sealed this

Twenty-eighth Day of January, 2003

JAMES E. ROGAN  
*Director of the United States Patent and Trademark Office*